United States Patent
Celi, Jr. et al.

(10) Patent No.: US 6,873,695 B2
(45) Date of Patent: *Mar. 29, 2005

(54) GENERIC SERVICE COMPONENT FOR VOICE PROCESSING SERVICES

(75) Inventors: Joseph Celi, Jr., Boca Raton, FL (US); Thomas E. Creamer, Boca Raton, FL (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 276 days.

This patent is subject to a terminal disclaimer.

(21) Appl. No.: 10/237,649

(22) Filed: Sep. 9, 2002

(65) Prior Publication Data

US 2004/0047462 A1 Mar. 11, 2004

(51) Int. Cl.[7] .......................... H04M 3/42; H04M 7/00; G06F 9/00
(52) U.S. Cl. .............................. 379/201.12; 379/221.08; 719/328
(58) Field of Search .................... 379/221.08–221.12, 379/219, 220.01, 229, 230, 201.12; 709/223; 719/310, 328

(56) References Cited

U.S. PATENT DOCUMENTS

| | | | |
|---|---|---|---|
| 5,193,110 A | 3/1993 | Jones et al. .................... 379/94 |
| 5,703,940 A * | 12/1997 | Sattar et al. ........... 379/201.05 |
| 5,892,764 A | 4/1999 | Riemann et al. ............ 370/401 |
| 5,991,389 A | 11/1999 | Ram et al. .................. 379/230 |
| 6,028,924 A * | 2/2000 | Ram et al. .................. 379/229 |
| 6,134,618 A | 10/2000 | Hebert ........................ 710/105 |
| 6,240,174 B1 | 5/2001 | Silver .......................... 379/230 |
| 2002/0154646 A1 * | 10/2002 | Dubois et al. .............. 370/406 |

* cited by examiner

*Primary Examiner*—Benny Tieu
(74) *Attorney, Agent, or Firm*—Akerman Senterfitt

(57) ABSTRACT

An advanced intelligent network for use with a call model can include a service logic execution environment (SLEE), at least one service application executing in the SLEE, and at least one voice processing generic service component communicatively linked to the service application. The voice processing generic service component can include an interface to a second service application which is external to the SLEE.

25 Claims, 3 Drawing Sheets

GENERIC SERVICE COMPONENT FOR VOICE PROCESSING SERVICES

BACKGROUND OF THE INVENTION

1. Technical Field

The present invention relates to the field of telephony voice processing, and more particularly, to generic service components for accessing voice processing services.

2. Description of the Related Art

The development of the open network application programming interface (API) represents an important departure from traditional methods for opening the architecture of the public switched telephone network (PSTN). Presently, the Advanced Intelligent Network (AIN) architecture defines a call model which allows the creation of telecommunications service applications outside of the switch environment. Telecommunications service applications are a la carte telecommunications applications which can perform enhanced services for a telecommunications session established among two or more parties. Exemplary service applications can include Call Waiting, Caller ID, Call Forwarding, Voice Activated Dialing, and Meet-me Conferencing.

When AIN first was introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will more closely resemble that of software and information technology in general, with customers reaping the benefits of increased competition, reduced time to market, and the rapid leveraging of new technology as it is developed.

In accomplishing this goal, a new service application component development paradigm has been established. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN®) fulfills the requirements of the new service application component development paradigm. Presently, JAIN includes standard, open published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 105 which can include interfaces to IP, wireline and wireless signaling protocols. These protocols can include TCAP, ISUP, INAP, MAP, SIP, MGCP, and H.323. The JAIN implementation also can include a signaling layer 110 which can include interfaces to provide connectivity management and call control. The conventional JAIN implementation also can include an application layer 115 for handling secure network access and other external services. Finally, the conventional JAIN implementation can include a service layer 120 which can include a JAIN compliant service creation and carrier grade service logic execution environment (JSLEE) 125.

In JAIN, the protocol layer 105 and the signaling layer 110 are based upon a Java standardization of specific signaling protocols and provide standardized protocol interfaces in an object model. Additionally, applications and protocol stacks can be interchanged, all the while providing a high degree of portability to the applications in the application layer using protocol stacks from different sources. By comparison, the application layer 115 provides a single call model across all supported protocols in the protocol layer 105. Fundamentally, the application layer 115 provides a single state machine for multiparty, multimedia, and multi-protocol sessions for service components in the application layer 115. This state machine is accessible by trusted applications that execute in the application layer 115 through a call control API.

Notably, applications or services executing at the application layer 115 can communicate directly with protocol adapters in the JSLEE 125. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 115 does not have to be aware of the underlying resources and can remain oblivious to the fact that some of its session or call legs may be using different protocols.

Service components 130 are the core JAIN components and can execute in the JSLEE 125. More particularly, service components 130 are constructed according to a standard component model, and instantiations of component assemblies can execute in coordination with the JSLEE 125. Using information regarding the protocol layer 105 which can be incorporated into the JSLEE 125, service components 130 can interact with the underlying protocol stacks without having specific knowledge of the protocol stack. The service components 130 can use the call model provided by the application layer 115 to implement telephony services. More importantly, the JSLEE 125 can relieve the service components 130 of conventional lifecycle responsibilities by providing portable support for transactions, persistence, load balancing, security, and object and connection instance pooling. In this way, the service components 130 can focus on providing telephony services.

Despite the advantages provided by JAIN, however, the development of a telecommunications service application still requires knowledge of many disparate communications interfaces and protocols for accessing the service components 130 and various service applications. For example, service applications such as call blocking or call forwarding, and service components for accessing the call model, can require access to voice processing services available from voice processing platforms. Accordingly, though service components 130 of the prior art can provide a standard component model for accessing the signaling layer 110, a telecommunication service application developer still needs a familiarity with the many disparate protocols for accessing voice processing platforms and other telephony functions such as directory services to successfully develop a telephony service application.

For example, conventional voice processing platforms communicate with service application logic through the use of an agreed upon messaging protocol. That is, for a voice processing platform to be used by application service logic operating over an intelligent network, the application service logic must support the particular protocol utilized by the voice processing platform. In consequence, the number of persons having the necessary expertise to develop a telephony service application can be limited. As the service application becomes more complex, requiring access to more service functions such as directory services and voice processing services, each using a different messaging protocol, the availability of skilled personnel decreases. The highly specialized nature of telephony service application development can result in increased developmental expenses and longer design cycles.

Further, the complexities involved make it difficult to port systems, features, and applications across diverse hardware and/or software environments. For example, because the protocol and logic necessary to access a particular service functionality are included within the service application being developed, any changes to an underlying protocol can necessitate reprogramming of the entire service application. To migrate a given telephony application to another hardware and/or software environment, the telephony application must be redesigned and/or recoded to work with the particular messaging protocol utilized by the voice processing platform with which the telephony application is to be used.

SUMMARY OF THE INVENTION

The invention disclosed herein concerns a method and a system for providing a generic service component (GSC) for use with a service logic execution environment (SLEE). In particular, a GSC can provide a common application programming interface (API) for accessing a particular voice processing platform or application. A voice processing GSC also can include the necessary functionality and protocol information for interacting with those voice processing platforms. Using the common API, voice processing GSCs can be made available to developers in a manner which does not require the developer to have knowledge of any underlying protocols incorporated within the voice processing GSC. Rather, the service application developer need only be concerned with the functionality of each voice processing GSC which is to be called upon within the developer's service application.

Accordingly, the present invention provides a solution on the same platform wherein the service logic executes for generically accessing any of a variety of manufacturer specific or disparate voice processing applications which may utilize different messaging protocols. By maintaining the voice processing platform interface on the service logic platform, service logic applications can be portable across diverse hardware and software platform environments when accompanied by a voice processing GSC.

One aspect of the invention can include an advanced intelligent network for use with a call model. The invention can include a SLEE, at least one service application executing in the SLEE, and at least one voice processing GSC communicatively linked to the service application. The voice processing GSC can include an interface to a voice processing application which is external to the SLEE.

A second aspect of the invention can include a voice processing GSC in a telephony environment having a SLEE. The voice processing GSC can be registered with the SLEE for interacting with a service application which may or may not execute within the SLEE. The voice processing GSC can include at least one client service instance. The client service instance can correspond to a voice processing application which can be external to the SLEE. Additionally, each client service instance can include a content interface for publishing an interface to the client service instance.

The voice processing GSC also can include a service wrapper. The service wrapper can provide a common interface to one or more client service instances for routing events between the SLEE and the various client service instances. The service wrapper can include a deployment descriptor for providing configuration information to the SLEE and a service interface for publishing an interface to the service wrapper. Also, the service wrapper can include a protocol stack for managing communications in the telephony environment. Notably, the voice processing GSC can interact with other GSCs, service components, protocol stacks, and external applications.

Another aspect of the invention can include a method of routing events between the SLEE and a voice processing GSC in a telephony environment. In that case, the method can include the voice processing GSC registering with the SLEE and the voice processing GSC receiving a first event routed by the SLEE. The first event can correspond to a service application which the voice processing GSC has been registered to receive from the SLEE. Further, the first event can be from a protocol stack, a service component, an external application, or another GSC. At least one client service instance can be instantiated for communicating with a voice processing application. The client service instance can interact with the voice processing application. A second event can be posted to the SLEE responsive to the interaction between the client service instance and the voice processing application. The second event can correspond to the interaction, and can be directed to the service application executing within the SLEE.

BRIEF DESCRIPTION OF THE DRAWINGS

There are shown in the drawings embodiments which are presently preferred, it being understood, however, that the invention is not limited to the precise arrangements and instrumentalities shown.

DESCRIPTION OF THE INVENTION

The invention disclosed herein concerns a method and a system for providing a generic service component (GSC) for use with a service logic execution environment (SLEE). In particular, a GSC can provide a common application programming interface (API) for accessing voice processing functions. Correspondingly, each GSC can include the necessary functionality and protocol information for interacting with a particular voice processing platform or application. The term "voice processing application", as used herein, can refer to a voice processing platform or a voice processing application, which is accessed through a particular messaging protocol. For example, a GSC for accessing voice processing functions can be configured to communicate with a voice processing application using the messaging protocol specific to that voice processing application.

Using the common API, voice processing capabilities can be made available to developers in a manner which does not require the developer to have knowledge of any underlying protocols incorporated within the GSC. Rather, the service application developer need only be concerned with the functionality of each GSC which is to be called upon within the developer's service application. Thus, the developer can devote more attention to combining the GSCs for accessing any service application or functionality needed by the service being developed. By providing a uniform interface which does not vary among protocols, and through which service applications and functions can be accessed, the invention disclosed herein facilitates faster and more efficient development of service applications.

In another aspect of the present invention, the GSCs can communicate with one another, in addition to external voice processing applications. The ability to communicate amongst GSCs enables the GSCs to be combined in a hierarchical manner. In particular, once a service application is developed using one or more GSCs, that service application can be thought of as a GSC in and of itself. Accordingly, once built, the service application can be accessed by other GSCs and incorporated within yet another service application which requires the functionality of the incorporated service application. As a result, the distinction between service application, shared service functions, and communications interfaces can be lessened. Specifically, each of the aforementioned, whether a GSC for accessing a service application or a service application, can become an object, in this case a GSC, within the telephony environment. Thus, service applications can access GSCs for performing service functions. Once built, the functionality of each service application further can be accessed by another higher level service application.

Figure 1:
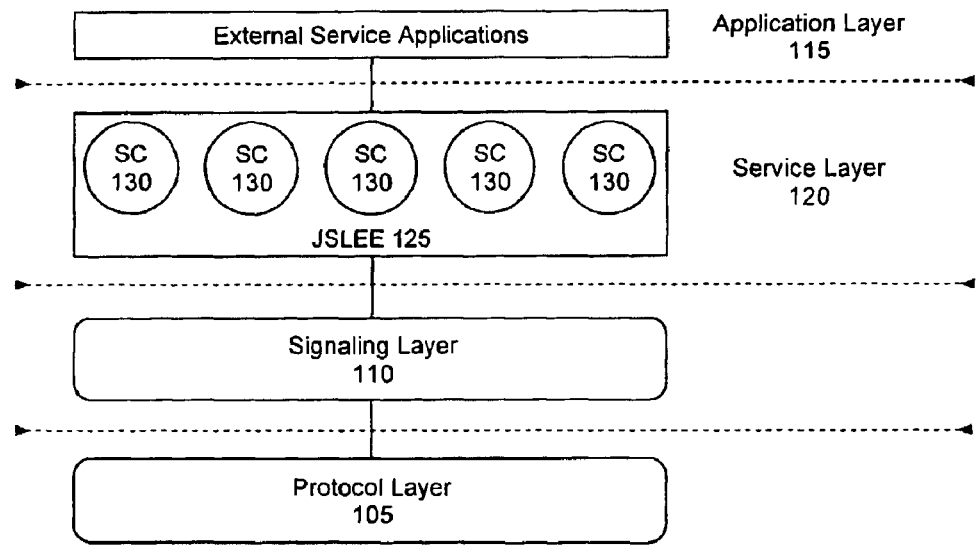
FIG. 1 is a schematic diagram illustrating an intelligent network architecture configured in accordance with a conventional JAIN implementation known in the prior art.
Figure 2:
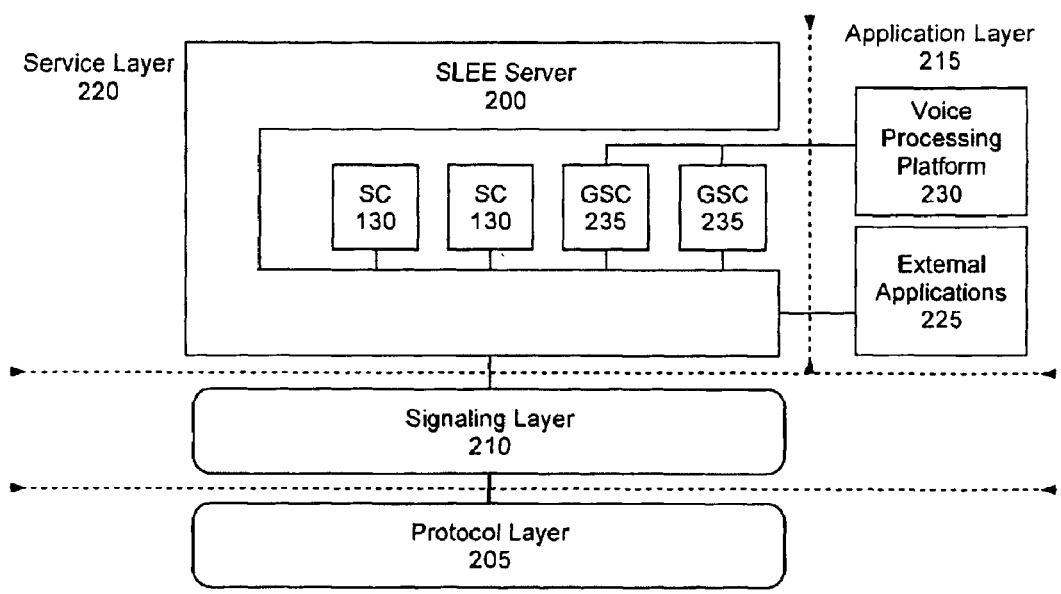
FIG. 2 is a schematic diagram illustrating an intelligent network architecture configured in accordance with the inventive arrangements disclosed herein.

FIG. 2 is a schematic illustration of an intelligent network configured in accordance with the inventive arrangements disclosed herein. Although the network can be configured as a JAIN-compliant network, the network need not be configured as such. The intelligent network can include a protocol layer 205, a signaling layer 210, an application layer 215, and a service layer 220. The application layer 215 can host external third party applications 225 as well as voice processing applications 230. Typical third party applications 225 can suit mass-market demand for services such as virtual private networks (VPNs), inbound services and unified messaging. External third party applications 225 also can include short-lived and niche applications which can be deployed using un-trusted application space deployment technologies such as database lookup interfaces, downloadable mechanisms, and the Parlay API, as are well known in the art.

The service layer 220 can include a SLEE server 200. For example, according to one embodiment of the present invention, the SLEE server 200 can be a JAIN compliant SLEE server or JSLEE server. The protocol layer 205 can include one or more protocol stacks which can be configured to interact with the service components 130 and voice processing GSCs 235 executing in the SLEE Server 200 through a signaling layer 210. Notably, the invention is not limited in regard to the number or type of protocol stacks which can be included in the SLEE server 200. Rather, SLEE Server 200 can interact with any protocol stack, for example those protocol stacks configured in accordance with the JAIN specification.

The voice processing GSCs 235 can provide a common API for accessing voice processing services from one or more different voice processing applications 230. A voice processing GSC 235 can be built for each different voice processing application 230. Moreover, a voice processing GSC 235 can be built for each different protocol used by a voice processing application 230. Thus, as shown in FIG. 2, a plurality of voice processing GSCs 235 can be included, each corresponding to a particular messaging protocol or voice processing application. For example, a different voice processing GSC 235 can be built for each different manufacturer specific voice processing platform and/or application.

The SLEE Server 200 also can include several lifecycle management functions enabling the voice processing GSCs 235 to be properly loaded within the SLEE Server 200 for execution. The SLEE Server 200 can identify configuration and loading parameters associated with each voice processing GSC 235 to be loaded. Subsequently, the SLEE Server 200 can execute the voice processing GSCs 235 using the identified configuration and loading parameters. Finally, the voice processing GSCs 235 can register with an internal event handling component in the SLEE Server 200 so that events can be transmitted to and from the voice processing GSCs 235 executing in the SLEE Server 200.

In operation, the SLEE Server 200 can support the transmission and receipt of events to and from the protocol stacks in the protocol layer 205. More particularly, the events can be transmitted and received in the event handling component included in the SLEE Server 200. Likewise, service components 130 and voice processing GSCs 235 which are registered with the SLEE Server 200 can receive protocol stack events directed towards particular ones of the service components 130 and the voice processing GSCs 235. More specifically, the event handling component can route received events to service components 130 which have registered with the SLEE Server 200 to receive such events. The service components 130 and voice processing GSCs 235 further can post protocol stack events to the SLEE Server 200.

The SLEE Server 200 also can receive and transmit messages among voice processing GSCs 235, service components 130, and between a voice processing GSC 235 and a service component 130. Specifically, voice processing GSCs 235 can be configured to post messages to the event handling component of the SLEE Server 200. The voice processing GSCs 235 further can be registered with the SLEE Server 200 to receive posted events from other GSCs, whether voice processing GSCs or not, as well as service components 130. In this way, inter-GSC and service component communications can be made possible. The voice processing GSCs 235 can be configured to receive events from external applications 225 through the SLEE Server 200. For example, those events which are received from external applications 225 can be posted to the event handling component of the SLEE Server 200. The events then can be routed to voice processing GSCs 235 that have registered to receive such events.

Figure 3:
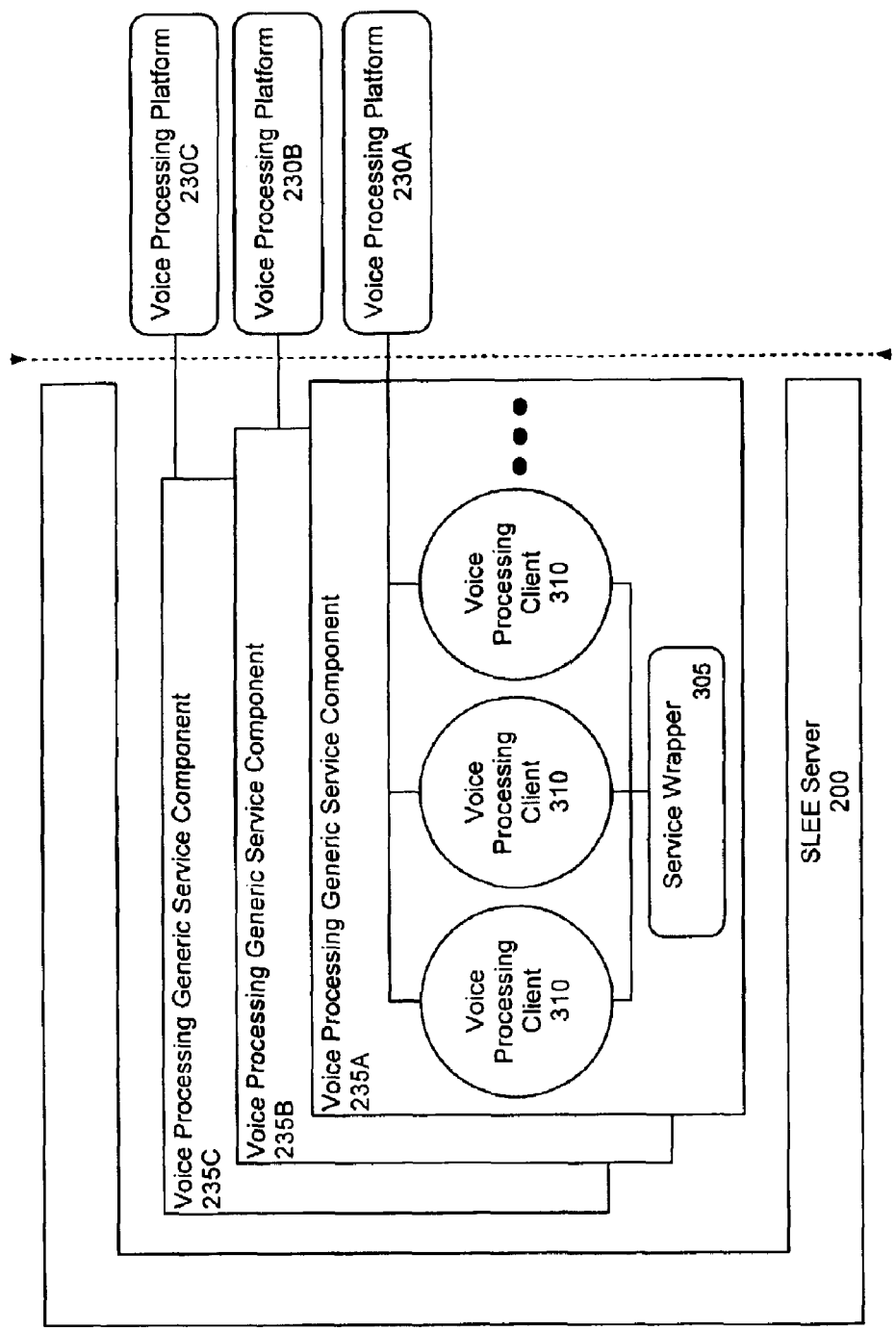
FIG. 3 is a schematic diagram illustrating multiple exemplary voice processing generic service components for use with the intelligent network architecture of FIG. 2.

FIG. 3 is a simplified pictorial representation of the exemplary voice processing GSCs 235 of FIG. 2. As shown in FIG. 3, a voice processing GSC 235 can include a service wrapper 305 and one or more client service instances 310. The service wrapper 305 can register with the SLEE Server 200 to receive a particular type of event corresponding to a voice processing function to be performed by an associated voice processing application 230. Accordingly, the service wrapper 305 can include the functionality necessary to translate a received event and reformat that event according to a particular messaging protocol utilized by the associated voice processing application 230. The reformatted event can be routed to the particular voice processing application 230 associated with the voice processing GSC 235 having received the event. The service wrapper 305 can instantiate a client service instance 310 for processing a particular transaction or one or more events. The client service instance 310 also can be instantiated for communicating with a particular voice processing application 230.

As shown in FIG. 3, and in accordance with the inventive arrangements disclosed herein, one or more voice processing GSCs 235A, 235B, and 235C can be provided, wherein each corresponds to a manufacturer specific voice processing application or to a particular messaging protocol used by one or more voice processing applications. For example, the service wrapper 305, as part of the voice processing GSC 235A, can register with the SLEE Server 200 to receive voice processing events. The voice processing GSC 235A can be configured to utilize the same messaging protocol as the voice processing application 230A. As shown in FIG. 3, the service wrapper 305 has instantiated three client service instances 310, one for each received event or series of events comprising a transaction relating to a voice processing function. Alternatively, a single client service instance 310 can handle multiple transactions. Thus, each client service instance 310 of voice processing GSC 235A can interact with an associated one of the voice processing applications, in this case voice processing application 230A.

Similarly, the voice processing GSC 235B and 235C each can include a service wrapper and one or more client service instances for interacting with the voice processing applications 230B and 230C respectively. Notably, if voice processing applications 230B and 230C each utilize the same messaging protocol, then a single voice processing GSC 235 can interact with both voice processing applications. Still, it should be appreciated that a voice processing GSC can be built for any voice processing application or protocol, including proprietary or private interfaces and messaging protocols, as may be necessary.

Figure 4:
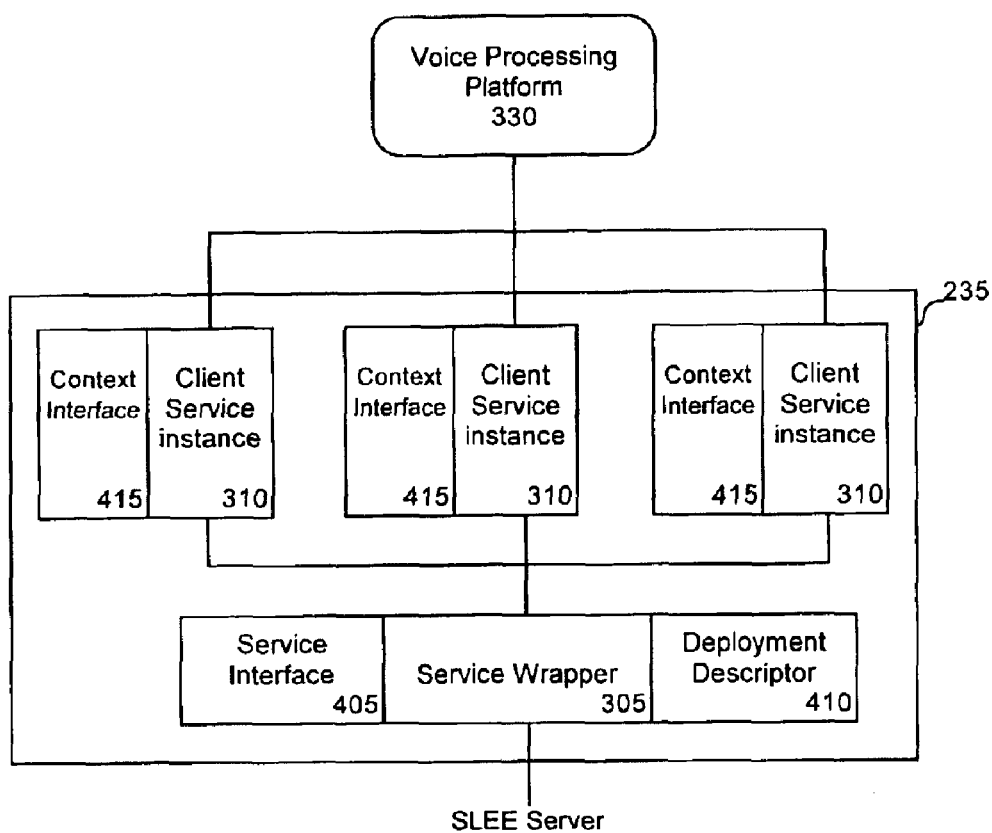
FIG. 4 is a schematic diagram illustrating an exemplary voice processing generic service component.

FIG. 4 is a schematic diagram illustrating the exemplary voice processing GSC 235 of FIG. 3. As shown in FIG. 4, the voice processing GSC 235 can include a service wrapper 305 and one or more client service instances 310 as previously discussed. The client service instances 310 can be individually instantiated services. Each service instance 310 further can register with the event routing bus of the SLEE Server. The voice processing GSC 235 also can include a service interface 405, a deployment descriptor 410, and one or more context interfaces 415. The deployment descriptor 410 can be a document, such as an extensible markup language (XML) document, which can describe the proper parameters for initially loading an instance of the voice processing GSC 235 in the SLEE Server. The service interface 405 can publish the interface to the service wrapper 305 to external objects. Accordingly, the service instance 310 can register with the internal event handling component of the SLEE Server via the service wrapper 305, and specifically the deployment descriptor 410, to receive and transmit events to the protocol layer, as well as service components and the voice processing GSCs 235. Notably, the service interface 405 can be included as part of an XML document. Also, the interface to each client service instance 310 can be included as part of a corresponding context interface 415, which also can be published as part of an XML document.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. An advanced intelligent network for use with a call model comprising:
    a service logic execution environment (SLEE);
    at least one service application executing in said SLEE; and
    at least one voice processing generic service component communicatively linked to said service application, said voice processing generic service component comprising an interface to a voice processing application which is external to said SLEE.

2. In a telephony environment having a service logic execution environment (SLEE), a voice processing generic service component, being registered with the SLEE, for interacting with a service application, said voice processing generic service component comprising:
    at least one client service instance, each said client service instance corresponding to a voice processing application; and a service wrapper, said service wrapper providing a common interface to said at least one client service instance for routing events between the SLEE and said at least one client service instance.

3. The voice processing generic service component of claim 2, said service wrapper further comprising a deployment descriptor for providing configuration information to the SLEE.

4. The voice processing generic service component of claim 2, said service wrapper further comprising a service interface for publishing an interface to said service wrapper.

5. The voice processing generic service component of claim 2, said at least one client service instance further comprising a content interface for publishing an interface to said client service instance.

6. The voice processing generic service component of claim 2, wherein said voice processing generic service component interacts with other generic service components, external applications, service components, or protocol stacks.

7. The voice processing generic service component of claim 2, said service wrapper further comprising a protocol stack for managing communications in a telephony environment.

8. The generic service component of claim 2, wherein said service application is internal to the SLEE.

9. The generic service component of claim 2, wherein said voice processing application is external to the SLEE.

10. In a telephony environment having a service logic execution environment (SLEE), a method of routing events between the SLEE and a voice processing generic service component, said method comprising:

the voice processing generic service component registering with the SLEE; and the voice processing generic service component receiving a first event routed by the SLEE, said first event corresponding to a service application which the voice processing generic service component has registered to receive from the SLEE.

11. The method of claim 10, further comprising:

instantiating at least one client service instance for communicating with a voice processing application external to the SLEE, said client service instance interacting with said voice processing application.

12. The method of claim 11, further comprising:

posting a second event to the SLEE responsive to said interaction between said client service instance and said voice processing application, said second event corresponding to said interaction.

13. The method of claim 12, wherein said second event is directed to a service application executing within the SLEE.

14. The method of claim 10, wherein said first event is from a protocol stack.

15. The method of claim 10, wherein said first event is from another generic service component.

16. The method of claim 10, wherein said first event is from a service component.

17. The method of claim 10, wherein said first event is from an external application.

18. A machine readable storage, having stored thereon a computer program having a plurality of code sections executable by a machine for causing the machine to perform the steps of:

a voice processing generic service component registering with a service logic execution environment (SLEE); and the voice processing generic service component receiving a first event routed by the SLEE, said first event corresponding to a service application which the generic service component has registered to receive from the SLEE.

19. The machine readable storage of claim 18, further comprising:

instantiating at least one client service instance for communicating with a voice processing application external to the SLEE, said client service instance interacting with said voice processing application.

20. The machine readable storage of claim 19, further comprising:

posting a second event to the SLEE responsive to said interaction between said client service instance and said voice processing application, said second event corresponding to said interaction.

21. The machine readable storage of claim 20, wherein said second event is directed to a service application executing within the SLEE.

22. The machine readable storage of claim 18, wherein said first event is from a protocol stack.

23. The machine readable storage of claim 18, wherein said first event is from a service component.

24. The machine readable storage of claim 18, wherein said first event is from another generic service component.

25. The machine readable storage of claim 18, wherein said first event is from an external application.

* * * * *